United States Patent
Evans et al.

(10) Patent No.: US 9,672,022 B2
(45) Date of Patent: Jun. 6, 2017

(54) APPLICATIONS INCLUDING MULTIPLE EXPERIENCE MODULES

(75) Inventors: Christopher A. Evans, Sammamish, WA (US); Scott Jensen, Shoreline, WA (US); Advay V. Mengle, Bellevue, WA (US); Jeffrey T. Pearce, Seattle, WA (US); John Elsbree, Bellevue, WA (US); Louis M. Kahn, Bellevue, WA (US); Chad C. Neff, Everett, WA (US); Nermin Osmanovic, Seattle, WA (US); Nosherwan Minwalla, Sunnyvale, CA (US); Rajadurai Isaac Rajakumar, Bothell, WA (US); Dale A. Sather, Seattle, WA (US); Manuel A. Schröder, Redmond, WA (US); Ovidiu G. Temereanca, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 986 days.

(21) Appl. No.: 12/822,036

(22) Filed: Jun. 23, 2010

(65) Prior Publication Data

US 2011/0321028 A1    Dec. 29, 2011

(51) Int. Cl.
*G06F 9/44* (2006.01)
*G06F 9/445* (2006.01)
(Continued)

(52) U.S. Cl.
CPC .................. *G06F 8/65* (2013.01); *G06F 8/61* (2013.01); *G06F 8/68* (2013.01); *G06F 9/44536* (2013.01); *G06F 9/546* (2013.01); *G06F 17/3023* (2013.01)

(58) Field of Classification Search
USPC .... 717/173–178, 120; 455/414.1, 466, 3.06; 709/203, 217; 726/8, 29; 725/70, 87,
(Continued)

(56) References Cited

U.S. PATENT DOCUMENTS 6,487,723 B1 * 11/2002 MacInnis ...................... 725/132
6,754,829 B1 *  6/2004 Butt et al. .......................... 726/8
(Continued)

FOREIGN PATENT DOCUMENTS

JP    2003140902    5/2003
JP    2006275706    10/2006
(Continued)

OTHER PUBLICATIONS

Fontana, John., "Lotus Prepping a Deep, Broad Cloud Strategy", Retrieved at << http://www.networkworld.com/news/2010/011410-lotus-strategy.html >>, Jan. 14, 2010, pp. 3.
(Continued)

*Primary Examiner* — Tuan Vu

(57) ABSTRACT

An application on a device includes multiple experience modules that each implement a set of features when the application is running on the device. Each of the multiple experience modules includes a first component that includes code specific to a particular type of the device, and a second component that includes code that is common across multiple types of devices. Update packages changing individual ones of the multiple experience modules can be received from a deployment service and installed on the device.

14 Claims, 7 Drawing Sheets

(51) Int. Cl.
*G06F 17/30* (2006.01)
*G06F 9/54* (2006.01)

(58) Field of Classification Search
USPC .............................. 725/132; 713/1; 707/206
IPC .................................. G06F 8/62,8/65, 17/3023
See application file for complete search history.

(56) References Cited

U.S. PATENT DOCUMENTS

| | | | |
|---|---|---|---|
| 8,131,875 B1* | 3/2012 | Chen et al. | 709/246 |
| 2004/0168165 A1 | 8/2004 | Kokkinen | |
| 2005/0154759 A1 | 7/2005 | Hofmeister et al. | |
| 2005/0223376 A1* | 10/2005 | Morris | 717/177 |
| 2005/0273779 A1* | 12/2005 | Cheng et al. | 717/168 |
| 2007/0024751 A1 | 2/2007 | Morimoto et al. | |
| 2007/0067373 A1* | 3/2007 | Higgins et al. | 707/206 |
| 2007/0077921 A1* | 4/2007 | Hayashi et al. | 455/414.1 |
| 2007/0232223 A1* | 10/2007 | Bilange | 455/3.06 |
| 2008/0016176 A1* | 1/2008 | Leitner | 709/217 |
| 2008/0028390 A1 | 1/2008 | Fors et al. | |
| 2008/0065994 A1 | 3/2008 | Wang et al. | |
| 2008/0092197 A1 | 4/2008 | Koh | |
| 2008/0133569 A1* | 6/2008 | Vu et al. | 707/102 |
| 2008/0215733 A1 | 9/2008 | Paul et al. | |
| 2008/0301660 A1 | 12/2008 | Rao et al. | |
| 2009/0037445 A1* | 2/2009 | Ushiyama | 707/100 |
| 2009/0187901 A1 | 7/2009 | Kanai | |
| 2009/0249296 A1* | 10/2009 | Haenel et al. | 717/120 |
| 2009/0282093 A1 | 11/2009 | Allard et al. | |
| 2010/0088367 A1 | 4/2010 | Brown et al. | |
| 2010/0262619 A1 | 10/2010 | Zargahi et al. | |
| 2010/0268735 A1 | 10/2010 | Planty et al. | |
| 2011/0047540 A1* | 2/2011 | Williams et al. | 717/178 |

FOREIGN PATENT DOCUMENTS

| | | |
|---|---|---|
| JP | 2006293974 | 10/2006 |
| JP | 2007034750 | 2/2007 |
| JP | 2007172255 | 7/2007 |
| JP | 2007226740 | 9/2007 |
| JP | 2009193444 | 8/2009 |
| JP | 2009277251 | 11/2009 |
| JP | 2011515734 | 5/2011 |
| WO | WO-2008051972 | 5/2008 |
| WO | WO-2008114454 | 9/2008 |

OTHER PUBLICATIONS

Foley, Mary J., "Microsoft's S+S Strategy Grows Up", Retrieved at << http://redmondmag.com/articles/2009/11/01/microsofts-s_s-strategy-grows-up.aspx >>, Nov. 1, 2009, pp. 2.

Maistre, Ray L., "IPTV Forum: Three-Screen Fever", Retrieved at << http://www.lightreading.com/document.asp?doc_id=189601 >>, Mar. 23, 2010, pp. 4.

Claton, Steve., "Three Screens and a Cloud", Retrieved at << http://blogs.msdn.com/stevecla01/archive/2009/05/21/three-screens-and-a-cloud.aspx >>, May 21, 2009, pp. 6.

Singh, Basant N., "Best & Free Cloud Computing Applications", Retrieved at << http://www.techno-pulse.com/2010/01/best-free-cloud-computing-applications.html >>, Jan. 21, 2010, pp. 5.

Bakhshi, et al., "Cloud Computing", Retrieved at << http://www.infosys.com/research/publications/Documents/cloud-computing.pdf >>, vol. 7, No. 7, 2009, pp. 100.

"Topics", Retrieved at << http://java.sun.com/javaone/2009/topics.jsp >>, Retrieved Date: Apr. 12, 2010, pp. 3.

"Java+ Community= Powerful", Retrieved at << http://java.sun.com/javaone/2009/pdfs/09J1_ACG_Prospect.pdf >>, Retrieved Date: Apr. 8, 2010, pp. 1-135.

"International Search Report", Mailed Date: Feb. 9, 2012, Application No. PCT/US2011/040310, Filed Date: Jun. 14, 2011, pp. 9.

"Foreign Office Action", Chinese Application No. 201180030885.4, (Aug. 6, 2013), 13 Pages.

"EP Search Report", EP Application No. 11798638.0, Oct. 21, 2013, 3 Pages.

"Foreign Office Action", EP Application No. 11798638.0, Nov. 4, 2013, 7 Pages.

Smith, "The Implementation of a Common User Interface Design Across a Heterogeneous Host/Display Device Environment", System Sciences. 1989. vol. IV: Emerging Technologies and Applications Track. Proceedings of the Twenty-Second Annual Hawaii International Conference on Kailua-Kona. HI. USA Jan. 3-6, 1989,1989, pp. 36-42.

"Foreign Office Action", CN Application No. 201180030885.4, Feb. 13, 2014, 10 Pages.

"Foreign Office Action", CN Application No. 201180030885.4, Jun. 4, 2014, 9 Pages.

"Foreign Office Action", CN Application No. 201180030885.4, Jan. 5, 2015, 11 Pages.

"Foreign Office Action", EP Application No. 11798638.0, Dec. 3, 2014, 3 Pages.

"Decision on Reexamination", CN Application No. 201180030885.4, Oct. 29, 2015, 15 pages.

"Foreign Notice of Allowance", JP Application No. 2013-516607, Sep. 2, 2015, 4 Pages.

"Foreign Office Action", EP Application No. 11798638.0, Jun. 19, 2015, 3 pages.

"Foreign Office Action", JP Application No. 2013-516607, Jun. 9, 2015, 10 Pages.

"Notice on Reexamination", CN Application No. 201180030885.4, Aug. 6, 2015, 12 Pages.

"Foreign Office Action", CN Application No. 201180030885.4, Apr. 6, 2016, 7 Pages.

* cited by examiner

APPLICATIONS INCLUDING MULTIPLE EXPERIENCE MODULES

BACKGROUND

A variety of different types of computing devices have become commonly available, such as desktop computers, wireless phones, game consoles, and so forth. Application developers often times desire to have their applications run on multiple ones of these different types of devices, allowing many more users to run these applications. However, this oftentimes requires application developers to duplicate a substantial part of their effort as they write and maintain a different version of their applications for each of these different types of devices. This can be problematic as it increases the cost and time incurred by the application developers in writing and maintaining the numerous different versions of their applications. At the same time, the application developers want to avoid a "least common denominator solution" that limits the experience of an application on some devices due to limitations on other devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application including multiple experience modules is installed on a device. The multiple experience modules each implement a set of features when the application is running on the device. Each of the multiple experience modules includes a first component that includes code specific to a particular type of the device, and a second component that includes code that is common across multiple types of devices. The application is run on the device in response to a request to do so.

In accordance with one or more aspects, a catalog of different update packages for different experience modules of an application is maintained. The application includes multiple experience modules that each implement a set of features when the application is running on a device. Each of the multiple experience modules includes a first component that includes presentation logic and resources specific to a particular type of device, and a second component that includes business logic that is common across multiple types of devices. A determination is made as to whether there is an update package that applies to the application on the device. If there is an update package that applies to the application on the device, then the update package is sent to the device.

BRIEF DESCRIPTION OF THE DRAWINGS

The same numbers are used throughout the drawings to reference like features.

DETAILED DESCRIPTION

Applications including multiple experience modules are discussed herein. Applications including multiple experience modules are delivered to multiple different types of devices where the applications are installed and executed. Each experience module in an application implements a set of one or more features for the experience associated with that module. Each experience module includes a generic business logic component that includes the business logic (e.g., instructions and data) for the associated experience. The generic business logic component is common to all devices, and is provided to the various devices for installation regardless of the type of the device. Each experience module also includes a device type specific presentation component that includes the presentation logic (e.g., instructions and data) and resources (e.g., resources for displaying the experience to the user, such as images, user experience layout markup, etc.) for the associated experience. Different presentation components are provided to different types of devices, allowing the presentation of the associated experience to be tailored to the particular type of device and the capabilities of that particular type of device.

Application updates can also be delivered to the various devices on which the application is installed. Application updates are on a per-experience module basis, and thus update an experience module of an application rather than the entire application. Changes to the business logic of an experience module can be provided to all devices on which the application is running regardless of the type of the device. However, changes to a presentation component of an experience module can be provided to only devices on which the application is running that are of the type corresponding to the changed presentation component.

Figure 1:
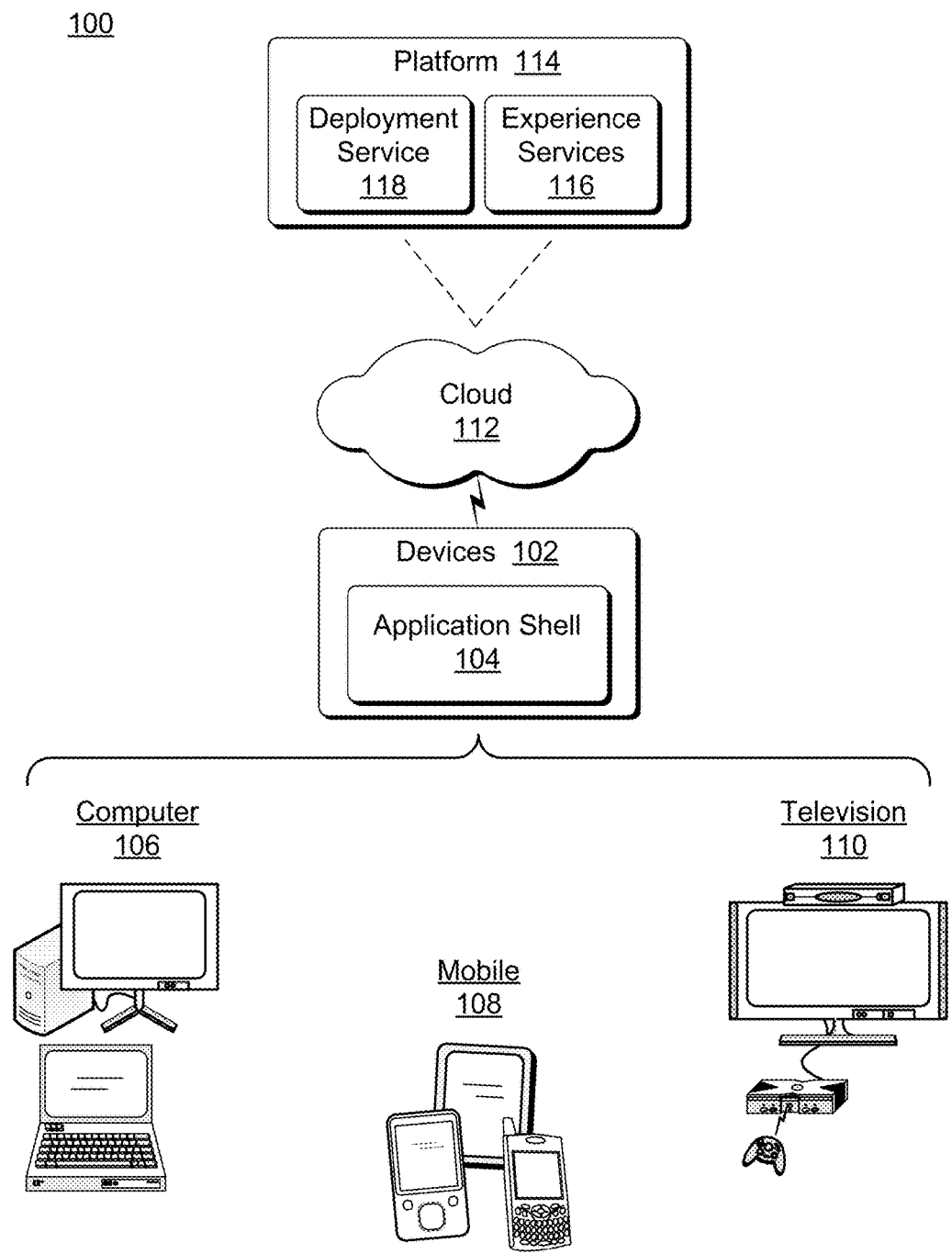
FIG. 1 illustrates an example system in which applications including multiple experience modules can be implemented in accordance with one or more embodiments.

FIG. 1 illustrates an example system 100 in which the applications including multiple experience modules can be implemented in accordance with one or more embodiments. System 100 enables environments for a common user experience when running applications on various devices, such as a personal computer (PC), a television device, and/or a mobile device. Services and applications run substantially similar in all three environments for a common user experience when transitioning from one device to the next while utilizing an application, playing a video game, watching a video, and so on.

Devices 102 include an application shell 104 supporting the installation and execution of applications made up of multiple experience modules. In various implementations, devices 102 can be a variety of different types of computing devices, such as a computer 106, a mobile device 108, or a television based device 110. Each of these different types of devices may have generally different constructs and capabilities, and thus the device 102 may be configured according to one or more of the different device types. For example, device 102 may be implemented as a computer 106 type of device, such as a personal computer, a desktop computer, a multi-screen computer, a laptop computer, a netbook, and so forth.

Device 102 may also be implemented as a mobile 108 type of device, such as a mobile phone, a portable music player, a portable gaming device, a tablet computer, a multi-screen computer, and so on. The device 102 may also be implemented as a television 110 type of device, such as devices having or connected to generally larger screens in casual viewing environments. For example, television 110 types of device can include televisions, set-top boxes, gaming consoles, and so on.

Additionally, device 102 can be implemented as a variety of other types of devices, such as appliances (e.g., refrigerators, microwaves, etc.), automotive PCs, clothing, and so forth. The techniques described herein can be supported by various types of devices 102 and are not limited to the specific examples described herein.

In the example system 100, multiple devices 102 of one or more different types can communicate with a cloud 112 at any given time. Cloud 112 is a collection of one or more server computers and/or other types of devices that are connected to devices 102 through a network and/or other data communication link. Such a network can be, for example, the Internet, a local area network (LAN), a cellular or other phone network, an intranet, a WiFi network, other public and/or proprietary networks, combinations thereof, and so forth. Such other data communication links can be wired and/or wireless links, such as a Universal Serial Bus (USB) link, wireless USB link, radio frequency (RF) link, other public and/or proprietary communication links, combinations thereof, and so forth.

Each of the different types of devices 102 can have different physical requirements and capabilities. The applications including multiple experience modules discussed herein enable the delivery of experiences to the devices 102 that are both tailored to the particular type of device and yet common to all types of devices. In one or more embodiments, types of devices are defined and experiences are tailored to the generic types of devices. A type of a device may be defined by physical features (e.g., display screen size, processor power, data input mechanisms supported, etc.), types of usage, and/or other common characteristics of the devices.

Cloud 112 includes and/or is representative of a platform 114 for one or more experience services 116 and a deployment service 118. Platform 114 abstracts underlying functionality of hardware (e.g., servers) and software resources of cloud 112. Services 116 and 118 can include applications and/or data that can be utilized by, but are remote from, devices 102. Services 116 and 118 can be provided as one or more services over a network and/or other data communication link as discussed above. Platform 114 can abstract resources and functions to connect the devices 102 with other computing devices (e.g., other device 102). Platform 114 can also serve to abstract scaling of resources to provide a corresponding level of scale to encountered demand for the services 116 that are implemented via the platform 114.

Experience services 116 includes applications and/or data that provide various functionality for applications. The particular functionality provided varies based on the type of application, and can include shopping or electronic store functionality, song or image (or other data) storage and/or retrieval functionality, search functionality, and so forth. Deployment service 118 manages the deployment of applications including multiple experience modules to devices 102. Various changes can be made to the applications over time, and deployment service 118 also manages the deployment of these changes to devices 102. The changes are deployed to the devices 102 to which the changes apply, as discussed in more detail below.

Each application is made up of multiple experience modules, with each experience module implementing a set of one or more features for the experience associated with or provided by that experience module. Different features refer to different functionality of the application that can be invoked by a user of the application or by another component or module. The different experience modules in an application are defined by the developer of the application and are generally defined so as to provide a logical grouping of features or functionality to the user of the application. The particular experience modules, and the set of features or functionality in each experience module, is decided upon by the developer of the application.

By way of example, assume a particular mobile device can operate as both a portable music player and a portable gaming device. An application on the mobile device can include a first experience module associated with a music playback experience, and implements various features related to the music playback experience such as transport controls (e.g., stop, play, rewind, shuffle, etc. features), playlist selection and creation features, and so forth. The application can also include a second experience module associated with a gaming experience, and implements various features related to the gaming experience such as game selection features, communication with an experience service 116 for online gaming, and so forth. The application can also include a third experience module associated with a marketplace experience, and implements various features related to an online marketplace via which a user can purchase new songs or games, such as search or browse features to allow a user to select a song or game for purchase, communication with an experience service 116 to provide credit card or other information for purchase of a song or game, and so forth.

Each experience module is separated into two components: a generic business logic component and a device type specific presentation component. The generic business logic component includes the business logic (e.g., the code—the instructions and data) for the associated experience that is common across all types of devices. Instructions and data which need not be different for different types of devices are included in the generic business logic component. The particular instructions and data included in the generic business logic component vary based on the particular application. For example, the generic business logic component can include instructions and data for shuffling songs on a playlist, searching for a word or phrase within a document, implementing spreadsheet calculation functionality, and so forth.

The device type specific presentation component includes the presentation logic (e.g., the code—the instructions and data) and resources (e.g., resources for displaying or otherwise presenting the experience to the user, such as images, user experience layout markup, etc.) for the associated experience. Different presentation components can be provided to different types of devices, allowing the developer of the application to tailor the presentation of the associated experience to the particular type of device and the capabilities of that particular type of device. Although different presentation components can be provided to different types of devices, situations can arise in which the same presentation component is provided to different types of devices.

In one or more embodiments, the presentation logic and resources tailor presentation of the associated experience to the particular type of device based on physical features (e.g., display screen size, processor power, input and/or output components, etc.) of that type of device. For example, first presentation logic and resources can be tailored to computer 106 types of devices that typically have large screens and large keyboards for data input. This first presentation logic and resources could include a user interface (UI) supporting large windows and/or frames in which data is displayed, a variety of different user inputs via a keyboard or mouse, and so forth. A second presentation logic and resources can be tailored to mobile 108 types of devices that typically have small screens and optionally small keyboards for data input. This second presentation logic and resources could include a UI supporting small windows and/or frames in which data is displayed, a variety of different user inputs via a microphone (e.g., voice commands) or a touchscreen, and so forth. A third presentation logic and resources can be tailored to television 110 types of devices that typically have very large screens but no keyboard for data input. This third presentation logic and resources could include a UI supporting large windows and/or frames in which data is displayed, a variety of different user inputs via a handheld remote control or handheld game controller, and so forth.

Figure 2:
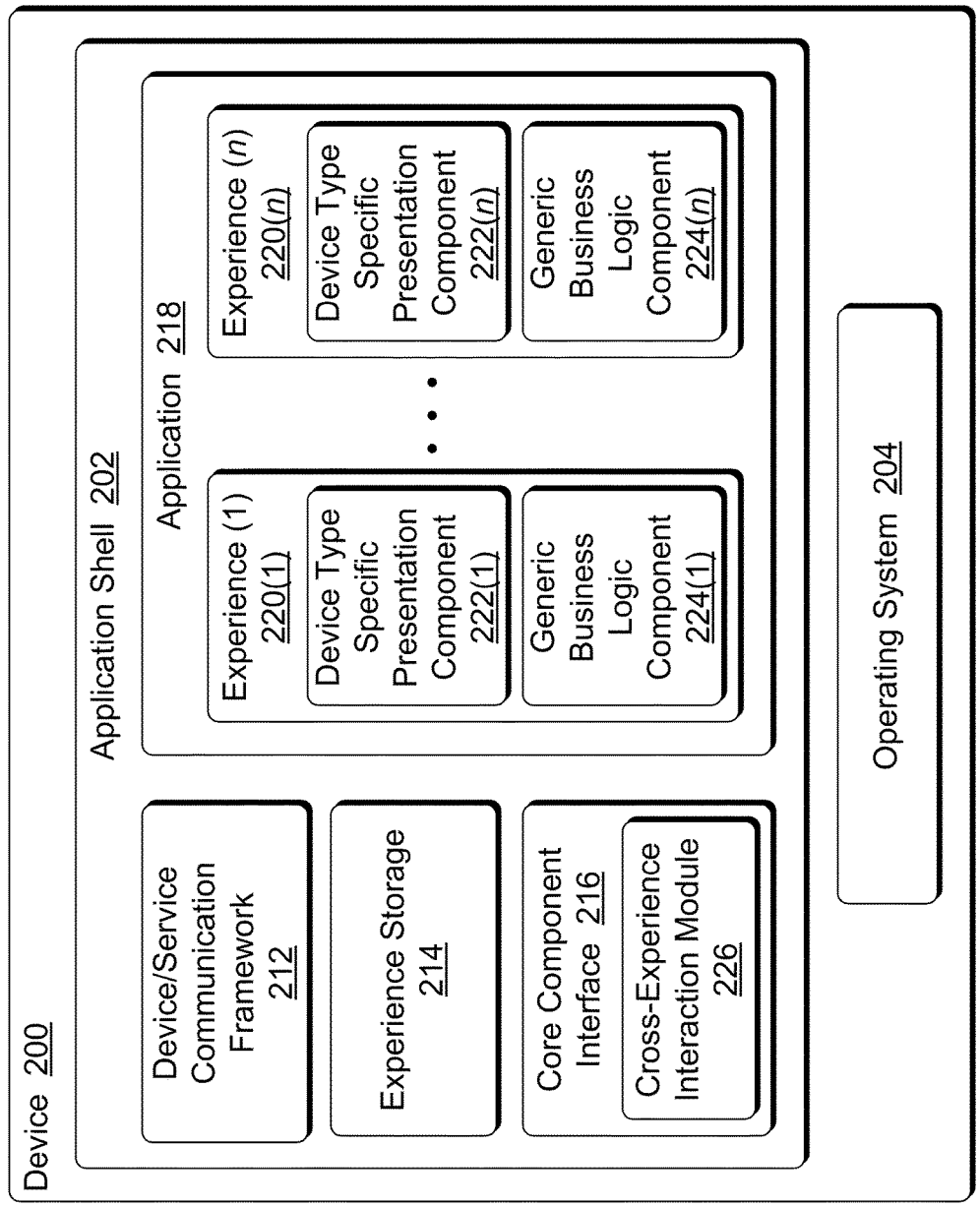
FIG. 2 illustrates an example device running applications including multiple experience modules in accordance with one or more embodiments.

It should be noted that the applications discussed herein are not merely Web applications that are downloaded and run in a Web browser on devices 102. Rather, the applications discussed herein are deployed to and installed on devices 102 from cloud 112 in a variety of environments. Various updates to the applications can also be deployed to and installed on devices 102 from cloud 112. Furthermore, the applications discussed herein can run when devices 102 are not connected to cloud 112 (although some functionality, such as accessing an online marketplace, may not be available to a device 102 when the device 102 is not connected to cloud 112). Additionally, the presentations of the different experiences in an application discussed herein are tailored to the particular type of device on which the application is running FIG. 2 illustrates an example device 200 running applications including multiple experience modules in accordance with one or more embodiments. Device 200 can be a variety of different types of computing devices, and is, for example, a device 102 of FIG. 1.

Device 200 includes an application shell 202 and an operating system 204. Operating system 204 can be any of a variety of conventional operating systems, such as any of the Windows® operating system family of operating systems available from Microsoft Corp. of Redmond, Wash., any of the Mac OS® operating system software family of operating systems available from Apple Corporation of Cupertino, Calif., a Linux based operating system, a Google Chrome based operating system, a phone based operating system, a portable gaming device based operating system, a set-top box based operating system, and so forth. An application shell 202 is run by operating system 204 to support applications including multiple experience modules. Alternatively, application shell 202 can be included as part of operating system 204 or operating system 204 can be included as part of application shell 202. One or more additional applications or shells (not shown) can also be run by operating system 204.

Application shell 202 supports the applications including multiple experience modules discussed herein. In the illustrated example, an application 218 is illustrated as being included in or running in shell 202. Although a single application 218 is illustrated as running in shell 202, it is to be appreciated that multiple applications can be running in shell 202 concurrently. Additionally, although a single application shell 202 is illustrated, it is to be appreciated that multiple application shells 202 (each running zero or more applications) can be running on device 200 concurrently.

Application 218 includes multiple (n) experience modules 220(1), . . . , 220(*n*), each associated with a different experience. In one or more embodiments, the collection of multiple experience modules 220 is the application 218, and no additional components or modules are included in application 218 other than experience modules 220. Thus, in such embodiments the experience modules 220 can be individual modules running in shell 202 and collectively are the application.

Shell 202 includes a device/service communication framework 212, an experience storage 214, and a core component interface 216. It is to be appreciated that the functionality of device/service communication framework 212 and core component interface 216 can be implemented as a single component or module, or as separate components or modules. It is also to be appreciated that the functionality of one or both of device/service communication framework 212 and core component interface 216 can be implemented as multiple components or modules.

Device/service communication framework 212 manages the communication between device 200 and the cloud (e.g., cloud 112 of FIG. 1). Components of application 218 can communicate with the cloud by sending requests to and/or receiving responses or other information from device/service communication framework 212. Device/service communication framework is configured with or otherwise has access to the various appropriate settings and protocols to permit device 200 to communicate with the cloud. Application 218 is thus alleviated of the burden of managing communication with the cloud. Rather, components of application 218 can invoke a standard interface (e.g., application programming interface (API)) exposed by device/service communication framework 212. Different device/service communication frameworks 212 on different types of devices may operate in different manners to communicate with the cloud, but still provide the same interface to the applications. Developers of the applications can write the applications without needing specific knowledge of how the devices on which those applications run communicate with the cloud.

Experience storage 214 manages the storage of components for application 218. Applications are deployed to device 200 from a cloud (e.g., cloud 112 of FIG. 1). Each application includes multiple user experience modules, and each user experience module includes multiple components as discussed above. When an application is deployed, these various components are received by device/service communication framework 212 and provided to experience storage 214. Experience storage 214 stores the received components in nonvolatile memory (e.g., a magnetic disk, an optical disc, Flash memory, and so forth).

When application 218 is first installed on device 200, a component of device 200 (e.g., core component interface 216 discussed below) performs the installation. The installation of application 218 includes various installation actions, such as writing particular files to particular locations on a storage device, adding information to a registration store (e.g., operating system registry), and so forth. Files can be written to experience storage 214 and/or other storage devices of device 200. After installation, application 218 can be run in shell 202. Application 218 can also subsequently be updated if a new version of application 218 becomes available, as discussed in more detail below.

Application 218 can be run in response to a request received from a user of device 200 or alternatively in response to a request from another component, module, or device. In response to a request to run application 218, shell 202 obtains the installed files for application 218 from experience storage 214 and/or other storage devices of device 200 and executes the obtained components. The particular components to be obtained and executed can be identified, for example, in a file or other information maintained by experience storage 214.

In one or more embodiments, multiple versions of components 218 are included in experience storage 214. For example, an updated version of a component can be received by device/service communication framework 212 in the form of an update package as discussed in more detail below. Installation of the update package results in a new version of the component on device 200. The previously deployed components and any update packages are maintained in experience storage 214, so both the updated version and the previous version of the components are maintained in experience storage 214. Maintaining the previous version of the component allows, for example, rolling back or returning to a previous version of application 218, keeping a record of changes to application 218, and so forth. Experience storage 214 can optionally delete previous versions of a component based on various criteria, such as after a particular amount of time elapses, after a particular number of update packages for the component have been subsequently stored in experience storage 214, and so forth.

An indication of the different experience modules that are included in application 218, as well as version numbers of those experience modules, is also maintained in experience storage 214. These version numbers identify current versions of the experience modules that are installed on device 200, and are updated as new versions of components in those experience modules are installed on device 200. A master version number of application 218 can also be maintained in experience storage 214. The master version number identifies a current version of application 218 that is installed on device 200, and is updated as new versions of components in the experience modules of application 218 are installed on device 200.

Core component interface 216 manages communication with operating system 204 as well as other devices 200, and also maintains various data regarding and supports various communications within shell 202. In one or more embodiments, core component interface 216 maintains a data cache that stores the results of requests sent to the cloud by device/service communication framework 212. This data cache can be maintained temporarily (e.g., while application 218 or shell 202 is running), or alternatively can be persisted in nonvolatile memory for longer durations.

Additionally, in one or more embodiments core component interface 216 includes a presentation framework that abstracts device-specific commands. Different types of devices, and even different devices of the same type (such as different models of devices, devices from different manufacturers, etc.) can implement specific presentation functionality in different manners. The presentation framework of interface 216 abstracts the manner in which specific presentation functionality is implemented, providing a standard interface (e.g., API) to components of application 218. Components of the applications can thus invoke the standard interface exposed by core component interface 216, allowing developers of the applications to write the applications without needing specific knowledge of how particular presentation commands or information is communicated to the particular hardware of the device on which the application is running In one or more embodiments, the presentation framework can be the Silverlight® platform available from Microsoft Corp. of Redmond, Wash.

Application 218 includes multiple (n) experience modules 220(1), . . . , 220(n), each associated with a different experience. These different experiences include different sets of features as discussed above. Additionally, each experience module 220 includes both a device type specific presentation component 222 and a generic business logic component 224. The generic business logic components 224 include the business logic (e.g., the instructions and data) for the associated experiences that is common across all types of devices as discussed above. The device type specific presentation components 222 include the presentation logic (e.g., instructions and data) and resources (e.g., resources for displaying or otherwise presenting the experience to the user, such as images, user experience layout markup, etc.) for the associated experiences that can be specific to or tailored to the type of device 200.

In one or more embodiments, application shell 202 (e.g., via core component interface 216) manages the execution of the components 222 and 224 so that experience modules 220 are isolated from one another. This isolation prevents a component in one experience module 220 from directly accessing a component (or general memory space used by a component) of another experience module 220. This isolation can also be referred to as sandboxing, and can be implemented by shell 202 in a variety of different conventional manners.

Although experience modules 220 are prevented from directly accessing one another, in one or more embodiments core component interface 216 includes a cross-experience interaction module 226 that supports cross-experience interaction to enable richer functionality not possible within a single isolated experience. Cross-experience interaction module 226 provides an interface via which one experience module 220 can send a message to another experience module 220. Such a message includes, for example, a requested action, zero or more parameters, and an indication of the experience to which the message is to be sent. The parameters typically include pointers to or other identifiers of data (e.g., a pointer to a particular song title, a pointer to particular movie data, etc.), but alternatively can include the actual data (e.g., the song title, the movie data, etc.). For example, one experience module 220 may be a content library experience module that provides a content library experience allowing a user to maintain and select particular content from his or her library (e.g., a library of songs or other audio and/or video content), while another experience module may be a content playback experience module that provides a content playback experience allowing playback of particular content. The content library experience module can send a "play song" message to the content playback experience module with a parameter that is a media item identifier of particular content selected by the user for playback.

Additionally, in one or more embodiments an experience module 220 can register with cross-experience interaction module 226 to indicate the types of actions that the experience module 220 can perform. This registration includes, for example, a list of potentially requested actions that the experience module 220 can perform. Other experience modules 220 can query cross-experience interaction module 226 to identify which requested actions can be performed by which experience modules 220, and thus can know to which experience module 220 a particular message is to be sent in order to have a particular requested action performed. Alternatively, for any given requested action, only one experience module 220 may register with cross-experience interaction module 226 as being able to perform that action. Accordingly, if another experience module 220 desires to have that action performed, a message requesting that the particular action (along with the appropriate parameters) can be sent to cross-experience interaction module 226. Cross-experience interaction module 226 knows which experience module 220 is registered for performing the requested action, and provides the message to that experience module 220.

In one or more embodiments, cross-experience interaction module 226 also supports returning response messages to the requesting experience module 220 (the experience module 220 from which a message requesting a particular action was received). The response message can include, for example, requested data, a confirmation that the action was performed, and so forth. The responding experience module 220 that sends the response message can identify the requesting experience module 220 to which the response message is to be sent (e.g., if an indication of the requesting experience module 220 was provided to the experience module by cross-experience interaction module 226). Alternatively, cross-experience interaction module 226 can maintain a record of messages that were sent and forward the response message to the requesting experience module 220 without the responding experience module knowing which experience module 220 is the requesting experience module 220.

Situations may arise where an experience module 220 does not understand a message that it receives. For example, a message may request an action that the receiving experience module 220 does not (or is not willing to) perform, the receiving experience module may be an older version that does not support the action, and so forth. In such situations, the message can simply be ignored by the receiving experience module 220. Alternatively, the receiving experience module 220 can return a response message or other indication that the requested action was not performed.

In one or more embodiments, experience modules 220 employ a uniform resource locator (URL) based protocol in sending messages to one another. The experience module 220 to which the message is to be sent, the requested action, and the parameters are embedded in a URL. A record of this URL can be kept by the experience module 220 sending the message, allowing a history of messages to be maintained, allowing messages with undo and/or redo commands to be sent to experience modules 220, and so forth.

Additionally, in one or more embodiments core component interface 216 supports cross-device communication, allowing device 200 to communicate with one or more other devices. For example, the cross-device communication allows different devices 102 of FIG. 1 to communicate with one another. Cross-device communication can be performed over a variety of different networks or communication links, analogous to the communication with the cloud (e.g., cloud 112 of FIG. 1) discussed above.

Core component interface 216 can support cross-device communication in different manners. In one or more embodiments, core component interface 216 includes an interaction module that supports communication with other devices in an analogous manner as device/service communication framework 212 communicates with the cloud (e.g., cloud 112 of FIG. 1). Core component interface 216 exposes a standard interface that components of application 218 can invoke, analogous to the interface exposed by framework 212 discussed above. Alternatively, a single interface can be exposed (e.g., by framework 212), and requests from a component of application 218 to access another device are routed to core component interface 216 by framework 212 rather than to the cloud.

Thus, a component of application 218 desiring to send a communication to another device can send the communication in an analogous manner to sending a communication to the cloud via framework 212, and receive responses from that other device in an analogous manner to receiving a communication from the cloud via framework 212, and need not be concerned with the various settings and/or protocols used to communicate with other devices. Rather, core component interface 216 is configured with or otherwise has access to such settings and/or protocols used to communicate with other devices. Core component interface 216 is also configured to identify other devices 200 with which device 200 can communicate. Other devices can be identified in a variety of different manners, such as using conventional Bluetooth device discovery techniques, using a matching service (e.g. provided by experience services 116 of FIG. 1), and so forth.

Although various discussions are included herein regarding updates to application 218, it is to be appreciated that other components or modules of device 200 can also be updated. For example, shell 202 can be updated. Updates to such other components or modules of device 200 can be provided to and made on device 200 in a variety of manners, such as using techniques analogous to the techniques for updating application 218 discussed herein, or using other techniques.

Figure 3:
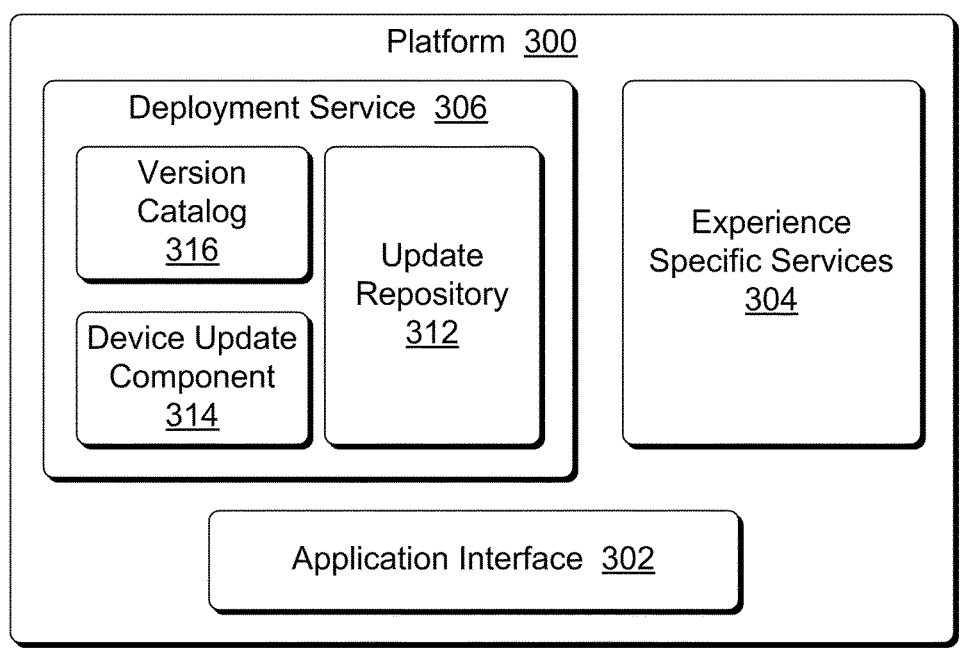
FIG. 3 illustrates an example platform supporting applications including multiple experience modules in accordance with one or more embodiments.

FIG. 3 illustrates an example platform 300 supporting applications including multiple experience modules in accordance with one or more embodiments. Platform 300 can be, for example, platform 114 of FIG. 1. Platform 300 can be implemented using one or more of a variety of different types of servers or other computing devices running various software.

Platform 300 includes an application interface 302, one or more experience specific services 304, and a deployment service 306. Application interface 302 is an interface (e.g., an API) exposed by platform 300 allowing applications running on devices (e.g., devices 102 of FIG. 1 or device 200 of FIG. 2) to communicate with platform 300. In one or more embodiments, device/service communication framework 212 of device 200 of FIG. 2 communicates with platform 300 by invoking application interface 302. The devices access experience specific services 304 and/or deployment service 306 via application interface 302.

Experience specific services 304 are, for example, experience services 116 of FIG. 1. Experience specific services 116 include applications and/or data that provide various functionality for applications. The particular functionality provided varies based on the type of application for which the service 304 provides functionality. For example, the particular functionality provided by an experience specific service 304 can include shopping or electronic store functionality, song or image (or other data) storage and/or retrieval functionality, search functionality, friend or buddy matching for online gaming, social networking functionality, and so forth.

Deployment service 306 manages the deployment of applications to devices (e.g., devices 102 of FIG. 1 or device 200 of FIG. 2). The deployment of an application to a device includes the initial deployment of the application (e.g., when the application is first installed on the device). The deployment of an application to a device also includes deploying changes to the applications that are installed on the devices. Alternatively, an application to be first installed on the device can be obtained in other manners, such as from an optical disc (e.g., DVD or CDROM), from another service, and so forth. However, even if the application is obtained from other than deployment service 306 for initial installation on the device, deployment service 306 subsequently manages deploying changes to that application.

The developer of an application can desire to change the application at various times for various reasons. For example, the developer may desire to add new functionality to the application, fix a problem found in the application, change (e.g., due to user feedback) the manner in which information is presented by the application on particular types of devices, and so forth. These changes can range from very significant changes to the application to very minor changes to the application.

When the developer changes an application, the developer changes one or more components of one or more experience modules of the application, resulting in a new version of the experience module. The developer typically need not change the entire application. Rather, only the experience modules affected by the desired change need be changed. For example, if the developer desires to make a change that affects just one experience module of an application that includes ten experience modules, then only a new version of that one experience module need be generated and deployed to the devices.

In one or more embodiments, a change to a component in an experience module is deployed by sending an update package for the changed experience module to the devices on which the application is installed and to which the change applies. The update package can identify the change in different manners, such as by including one or more replacement components for the experience module, including an indication of one or more changes to a component (e.g., a list of differences between the new version of the component and a previous version of the component), and so forth. The update package can also include new components for a new experience module being added to the application.

When the developer creates a new update package to change an application, the developer provides the new update package to platform 300. Deployment 306 includes an update repository 312 in which the update packages are stored. Previous versions of update packages can also be maintained in update repository 312, resulting in update packages for multiple different versions of the experience module being included in update repository 312.

Device update component 314 manages update repository 312, and also provides the appropriate update packages to the appropriate devices. Device update component 314 can maintain all previous versions of update packages, or alternatively can delete previous versions of update packages based on various criteria. For example, device update component 314 can delete a previous update package after a particular amount of time elapses, after a particular number of update packages of the same component have been subsequently stored in update repository 312, and so forth.

Device update component 314 also maintains information describing the various update packages in version catalog 316. Version catalog 316 can be a variety of different data structures, such as a table or list, identifying various information regarding the update packages stored in update repository 312. Version catalog 316 allows device update component 314 to determine, based on an indication of a version number received from a device, which (if any) update packages stored in update repository 312 are to be deployed to that device. In one or more embodiments, version catalog 316 includes a different table for each application, or alternatively the same table can be used for multiple applications and include an indication of which information in the table corresponds to which application.

It should be noted that some changes to an experience module may not apply to all types of devices on which an application is installed. For example, a change may be made to the device specific presentation component of an experience module for one particular type of device but not for other types of devices. Accordingly, the change to the experience module applies to devices of that one particular type, but not to other types of devices.

In one or more embodiments, version catalog 316 includes a table or list for each application installed on (or that can be installed on) a device, and each such table includes one or more records. Each record corresponds to a particular update package stored in update repository 312. The particular update package that corresponds to a record in version catalog 316 can be identified in different manners. In one or more embodiments, each record includes at least an experience module identifier, a master version number, and a device type. Update repository 312 is also keyed by the experience module identifier, master version number, and device type, maintaining a correspondence between the records in version catalog 316 and update repository 312.

Table I illustrates an example of information that is included in a record of version catalog 316 in accordance with one or more embodiments. It should be noted that Table I is an example, and that alternatively different information can be included in a record of version catalog 316 and/or some of the information included in Table I may not be included in a record of version catalog 316.

TABLE I

| Field | Description |
| --- | --- |
| Master version number | Incremented from the previous value each time there is a new version of the application (regardless of which experience module is changed) |
| Experience Identifier | An identifier of the experience module in which the change occurs. |
| Experience version number | Incremented from the previous value for the experience module in which the change occurs. |
| Immediate update | Indicates whether the device is to install the new version immediately or can defer until a later time. |
| Device type mask | An indication of one or more types of devices to which the update package applies. |
| User identifier | An indication of one or more users to which the update package applies. |
| Locale identifier | An indication of one or more locations of devices to which the update package applies. |

The master version number for an application is incremented each time there is a new version of the application, which can also be referred to as each time a new update package for the application is added to update repository 312. When device update component 314 receives an indication of a current version of the application installed on a device, device update component 314 compares the received version to the most recent master version number for the application in version catalog 316. If the two version numbers are the same, then there are no new update packages to deploy to the device. However, if the two version numbers are not the same, then a newer version of the application exists, so device update component 314 determines whether there are one or more update packages that are to be deployed to the device.

The experience identifier indicates which of the multiple experience modules included in the application the update package changes. Typically, a different update package includes changes to a single experience module, although alternatively an update package can include changes to multiple experience modules.

The experience version number is incremented each time there is a change to the experience module. Accordingly, the experience version number for an experience module is incremented each time there is a new update package for that experience module. Thus, whereas the master version number is incremented each time there is a change to any of the experience modules included in the application, the experience version number is incremented only when there is a change to the experience module identified by the experience identifier. The experience version number can have a particular value (e.g., a value of 1) if a new experience module is added by the update package.

The immediate update field indicates whether installation of the corresponding update package is to occur immediately or can be deferred. The developer of the application indicates whether installation of the corresponding update package is to occur immediately or can be deferred, and this indication is added as the immediate update field for the record corresponding to that particular update package.

As discussed above, not all update packages may apply to all devices. Accordingly, even though the master version number for the application in version catalog 316 is different from the current version of the application installed on a particular device, the newer versions of the application may not apply to that particular device. Device update component 314 determines whether an update package applies to a particular device based on one or more of the device type mask, the user identifier, and the locale identifier. The user identifier and the locale identifier can optionally be used to determine whether an update package applies to a particular device only if the user of the device opts into (or alternatively does not opt out of) allowing his or her user identifier and/or locale identifier to be used in this manner.

The device type mask indicates one or more types of devices to which an update package applies. The developer of the application indicates the types of devices to which a particular update package applies, and this indication is added as the device type mask for the record corresponding to that particular update package.

Similarly, the user identifier indicates one or more users to which an update package applies. The developer of the application may desire to, for example, test two different versions of an application. The developer creates two update packages with the two different versions, indicates which users are to receive which versions, and this indication is added to the user identifier field of the corresponding records. The users can be identified by, for example, a user name associated with the user (e.g., if the user has provided login information to platform 300), an identifier or physical feature of the device, and so forth. Alternatively, some users may sign up to be testers for a particular application. Device update component 314 receives an indication of whether a user of the particular device has signed up to be a tester (e.g., from the device itself, from another component or module of platform 300, and so forth). The user identifier can then indicate whether the corresponding update package applies to the device based on an identifier of the user of the device.

The locale identifier indicates one or more locations of devices to which an update package applies. The developer of the application may desire to, for example, have different versions of an application for different countries, for different states, based on other geographic locations or boundaries, or based on other location-based boundaries. The developer creates different update packages with the different versions, indicates which device locations are to receive which versions, and this indication is added to the locale identifier field of the corresponding records. Device update component 314 receives an indication of the location of a particular device (e.g., from the device itself, from another component or module of platform 300, and so forth). The locale identifier can then indicate whether the corresponding update package applies to the device based on the location of the device.

Device update component 314 can send one or more update packages to a device on which an application is installed in response to a variety of different events and/or at a variety of different times. In one or more embodiments, the core component interface (e.g., core component interface 216 of FIG. 2) of a device is configured to send an update check request to access deployment service 306 at regular or irregular intervals (e.g., daily), when an application begins executing, when execution of an application terminates, each time an application installed on a device submits a request to platform 300, and so forth.

The update check request sent by a device includes an indication of the type of the device and a master version number of the current application installed on the device. Device update component 314 checks version catalog 316 to determine whether there are update packages for any of the experience modules of the application that apply to the device. If there are update packages for any of the experience modules of the application that apply to the device then those update packages are deployed to the device; otherwise, no update packages are deployed to the device.

Alternatively, the device can check for updates to an application in other manners. For example, rather than sending the master version number of the current application installed on the device, the update check request can include an identifier of a particular experience module and an experience version number of the experience module of the current application installed on the device. The device can thus check for updates on an experience module by experience module basis.

In other embodiments, rather than having the device send an update check request to platform 300, platform 300 can push update packages to the devices. For example, device update component 314 can maintain a record of the master version numbers (and/or experience version numbers) of the applications installed on various devices. When an update package is available that applies to a device but has not yet been deployed to the device, device update component 314 deploys that update package to the device.

Deployment service 306 also supports revocation of an update package. In one or more embodiments, to revoke an update package a developer provides a replacement update package (which could be, for example, the previous update package that was used prior to the revoked update package). The developer also indicates that installation of the replacement update package is to occur immediately. The replacement update package will thus be deployed to the appropriate devices to effectively revoke the previous update package.

As discussed above, when a developer changes an application, the developer provides an update package for the change to be stored in update repository 312, and information describing the update package for inclusion in version catalog 316. The developer can provide the update package and information describing the update package in different manners. For example, the update package and information describing the update package can be provided to an administrator of platform 300 via an electronic communication (e.g., email), via an optical disc or other portable storage media, and so forth. The administrator of platform 300 can then add the update package to update repository 312 and the information describing the update package to version catalog 316.

Alternatively, the update package and information describing the update package can be obtained by device update component 314 automatically. For example, the developer can maintain on a server or other computing device the update package and information describing the update package (in an analogous manner as deployment service 306 maintains the update package and information describing the update package). Device update component 314 can send an update request to the computing device maintained by the developer, and obtain the update package and information describing the update package from that computing device. Thus, deployment service 306 can automatically obtain the update package and information describing the update package from a computing device maintained by the developer in a manner analogous to the device obtaining the update package and information describing the update package from deployment service 306.

Figure 4:
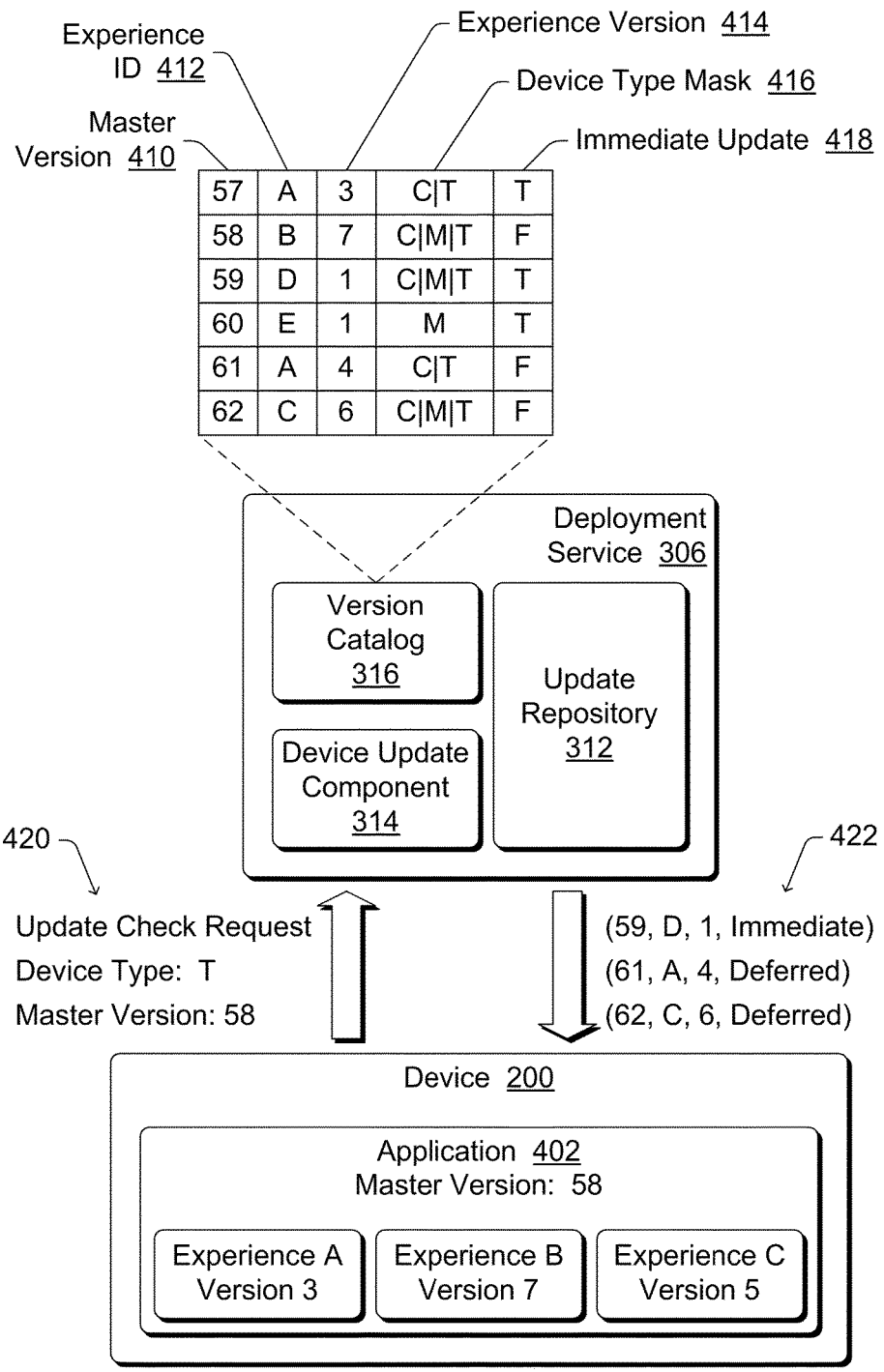
FIG. 4 illustrates an example of updating an application in accordance with one or more embodiments.

FIG. 4 illustrates an example of updating an application in accordance with one or more embodiments. In the example of FIG. 4, a deployment service 306 of FIG. 3 and a device 200 of FIG. 2 are illustrated. An application 402 installed on device 200 has a master version number of 58, and three experience modules. The first experience module in application 402 has an experience identifier of A and an experience version number of 3. The second experience module in application 402 has an experience identifier of B and an experience version number of 7. The third experience module in application 402 has an experience identifier of C and an experience version number of 5.

Version catalog 316 is illustrated as a table with example data. The table of version catalog is illustrated with multiple records (each being a horizontal row in the table). In the table of version catalog 316, the first column indicates a master version number 410, the second column indicates an experience identifier 412, the third column indicates an experience version number 414, the fourth column indicates a device type mask 416, and the last column indicates an immediate update value 418. Additional rows (not shown) can also be included in version catalog 316, such as rows corresponding to update packages prior to master version number 57. For the device type mask 416, values of "C", "M", and "T" are used to represent computer types of devices (e.g., computer devices 106 of FIG. 1), mobile types of devices (e.g., mobile devices 108 of FIG. 1), and television based types of devices (e.g., television based devices 110 of FIG. 1), respectively. For the immediate update value 418, a value of "T" is used to indicate that installation of the corresponding update package is to occur immediately, and a value of "F" is used to indicate that installation of the corresponding update package can be deferred.

As can be seen from version catalog 316, the first row corresponds to an update package that has a master version number of 57, is for an experience module having an experience identifier A, has an experience version number of 3, is for computer types of devices and television based types of devices, and installation of the corresponding update package is to occur immediately.

Device 200 sends an update check request 420 to deployment service 306 identifying the type of device 200 (a television based type of device) and a current master version number of device 200 (which is 58). Device update component 314 evaluates the update check request against version catalog and determines that the update packages corresponding to master version numbers 59, 61, and 62 are to be deployed to device 200. Update packages having version numbers less than or equal to the current version number of device 200 have already been deployed to device 200. Accordingly, the update packages corresponding to master version numbers 57 and 58 need not be deployed again to device 200.

The update package corresponding to master version number 59 is for a new experience module that is not yet installed on device 200, and thus is to be deployed to device 200. The update packages corresponding to master version numbers 61 and 62 are both for new versions of experience modules previously installed on device 200, and thus are to be deployed to device 200. The update package corresponding to master version number 60 is for a new experience module that is not installed on device 200, but does not apply to television based types of devices (it applies to mobile types of devices). Accordingly, the update package corresponding to master version number 60 is not deployed to device 200.

Thus, device update component 314 returns an indication 422 to device 200 that the update packages corresponding to master version numbers 59, 61, and 62 are to be deployed to device 200. Various information from version catalog 316 can also be included in indication 422. In one or more embodiments, device update component 314 returns, for each update package that is to be deployed to device 200, an indication of the master version number, the experience module that the update package changes, an experience version number for the new version of the experience module, and an indication of whether installation of the corresponding update package is to occur immediately or can be deferred.

Returning to FIG. 2, device/service communication framework 212 receives a response to an update check request from the deployment service (e.g., deployment service 306 of FIG. 3). The response includes an indication of the particular one or more update packages, if any, that are to be installed on device 200 for application 218. The one or more update packages themselves can also be included in the response received from the deployment service, or alternatively device/service communication framework 212 can subsequently submit a request to the deployment service for the particular one or more update packages and in response to such a request receive the particular one or more update packages in response to the subsequent request.

In one or more embodiments, when one or more update packages that are to be installed on device 200 are received by device/service communication framework 212, framework 212 stores the update packages in experience storage 214 and notifies core component interface 216 of the received one or more update packages. Core component interface 216 then installs the update packages on device 200, resulting in an updated version of the application being installed on device 200. This installation can include a variety of different actions, such as writing particular files to particular locations on a storage device, adding information to a registration store (e.g., operating system registry), updating database schema, and so forth. Files can be written to experience storage 214 and/or other storage devices of device 200. In some situations, after installing an update package for application 218, device 200 is rebooted before application 218 can be executed. In other situations, application 218 can be executed after installing an update package for application 218 without rebooting device 200.

If an indication of an update package indicates that installation of the corresponding update package is to occur immediately, then core component interface 216 installs the update package as soon as possible. This installation as soon as possible can include installing the update package before application 218 is executed again, shutting down application 218 if already running and installing the update package, and so forth.

However if an indication of an update package indicates that installation of the corresponding update package can be deferred, then core component interface 216 installs the update package at some later time. Core component interface 216 can determine when to install an update package for which installation can be deferred in different manners, such as before application 218 is executed again, after execution of application 218 terminates, prior to the next time device 200 is powered down or reset, when application 218 is not executing and device 200 is idle (e.g., processor and/or other resource usage on device 200 is below a threshold amount), and so forth.

Figure 5:
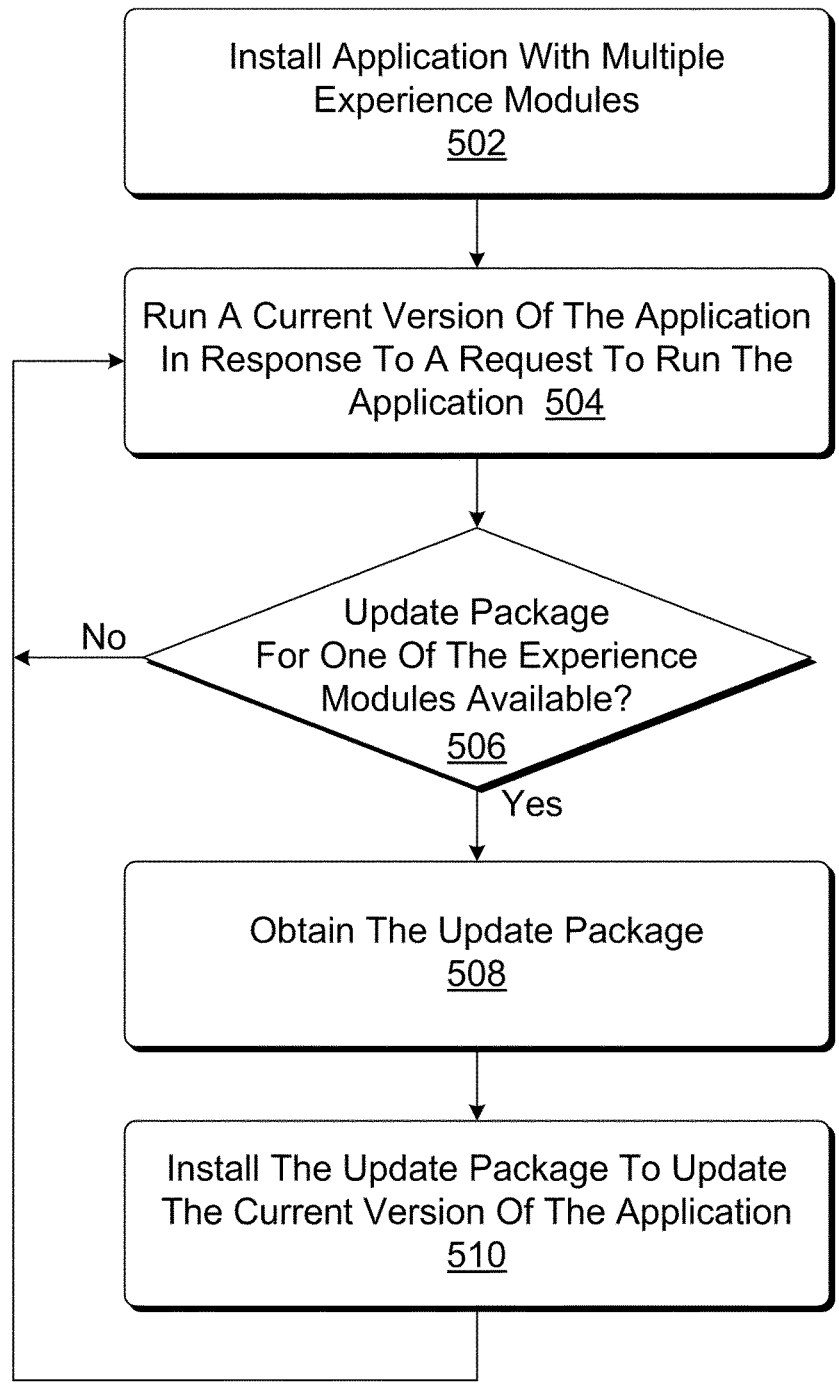
FIG. 5 is a flowchart illustrating an example process for installing and obtaining update packages for applications including multiple experience modules in accordance with one or more embodiments.

FIG. 5 is a flowchart illustrating an example process 500 for installing and obtaining update packages for applications including multiple experience modules in accordance with one or more embodiments. Process 500 is carried out by a device, such as device 102 of FIG. 2 or device 200 of FIG. 2, and can be implemented in software, firmware, hardware, or combinations thereof. Process 500 is shown as a set of acts and is not limited to the order shown for performing the operations of the various acts. Process 500 is an example process for implementing applications including multiple experience modules; additional discussions of implementing applications including multiple experience modules are included herein with reference to different figures.

In process 500, an application with multiple experience modules is installed (act 502). The application is installed on the device implementing process 500, and includes multiple experience modules as discussed above.

A current version of the application is run in response to a request to run the application (act 504). This current version of the application is the most recent version of the application that is installed on the device implementing process 500.

Additionally, a check is made as to whether an update package for one of the experience modules is available (act 506). Such an update package would be an update package that applies to the device implementing process 500. The check is made by sending to a deployment service a request to check for updates.

If no update package for an experience module of the application is available, then process 500 returns to act 504 to run the current version of the application. However, if an update package for one of the experience modules is available, then the update package is obtained (act 508).

The obtained update package is installed to update the current version of the application (act 510). The update package can be installed after the application finishes running (e.g., if installation of the update package can be deferred), or alternatively the application can terminate execution so that the update package can be installed (e.g., if the update package is to be installed immediately) and the application run again. Process 500 then returns to act 504 to continue running the current version of the application.

It should be noted that, despite the ordering of the acts in FIG. 5, the application can be run prior to checking for availability of an update package in act 506, or alternatively availability of an update package can be checked for prior to running the application.

Figure 6:
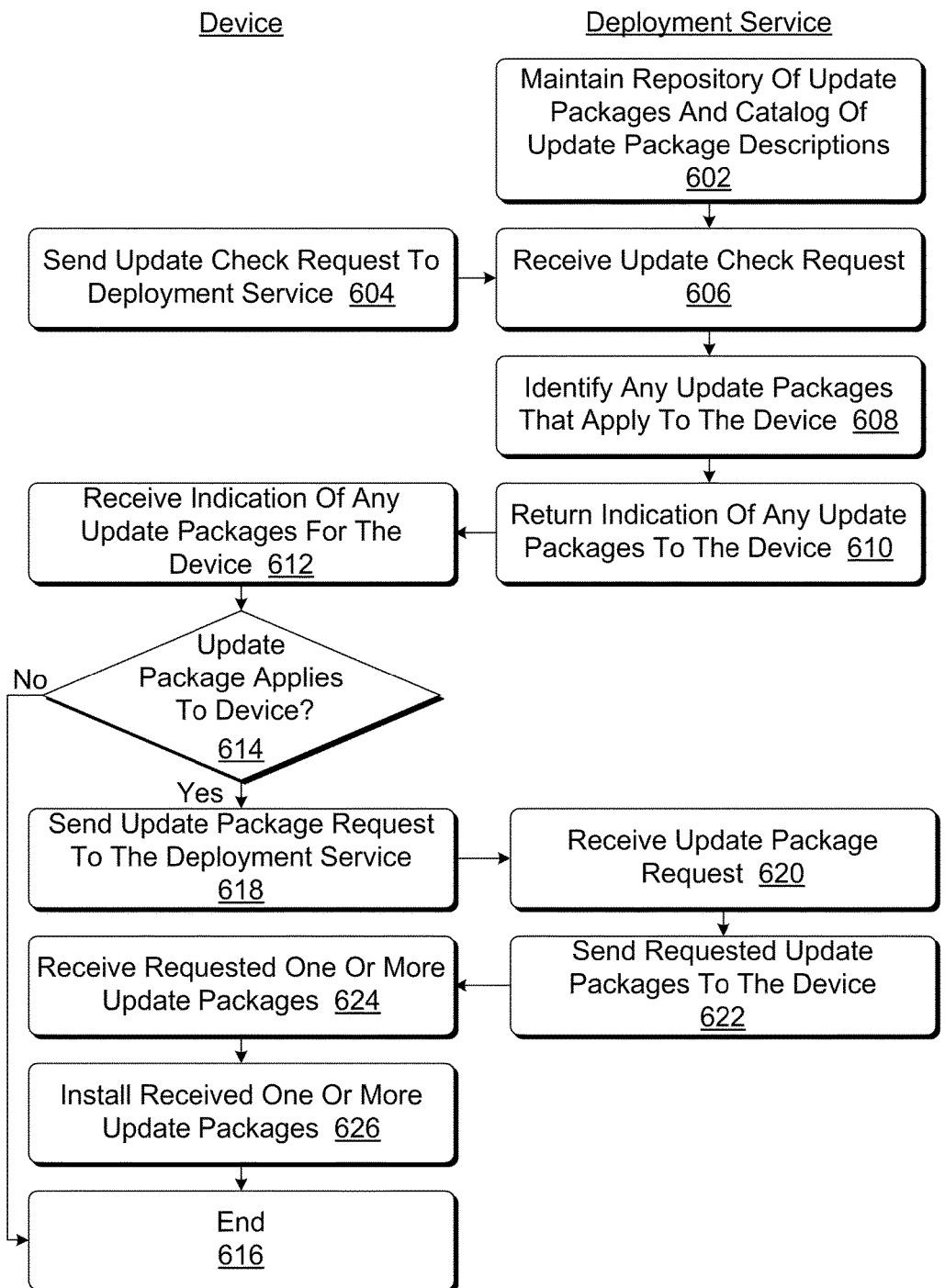
FIG. 6 is a flowchart illustrating an example process for deploying updates to a device in accordance with one or more embodiments.

FIG. 6 is a flowchart illustrating an example process 600 for deploying updates to a device in accordance with one or more embodiments. Process 600 can be implemented in software, firmware, hardware, or combinations thereof. Acts of process 600 illustrated on the left-hand side of FIG. 6 are carried out by a device, such as device 102 of FIG. 1 or device 200 of FIG. 2. Acts of process 600 illustrated on the right-hand side of FIG. 6 are carried out by a deployment service, such as deployment service 118 of FIG. 1 or deployment service 306 of FIG. 3. Process 600 is shown as a set of acts and is not limited to the order shown for performing the operations of the various acts. Process 600 is an example process for deploying updates to a device; additional discussions of deploying updates to a device are included herein with reference to different figures.

In process 600, a repository of update packages and a catalog of update package descriptions are maintained at the deployment service (act 602). The update packages include changes to experience modules for particular applications as discussed above.

The device sends an update check request to the deployment service (act 604). The update check request can be sent at various times and/or in response to various events as discussed above.

The deployment service receives the update check request (act 606), and identifies any update packages that apply to the device (act 608). Whether an update package applies to the device can depend on various different criteria as discussed above, such as current experience module versions on the device, the type of the device, a user of the device, and so forth.

An indication of any update packages that apply to the device is returned to the device (act 610). This indication identifies zero or more update packages that apply to the device.

The device receives the indication of any update packages from the deployment service (act 612), and checks the indication to determine whether one or more update packages apply to the device (act 614).

If there are no update packages that apply to the device, then the current check for updates ends (act 616). However, the deployment service continues to maintain the repository of update packages and the catalog of update package descriptions (act 602), and process 600 can be repeated for subsequent update check requests to be sent to the deployment service.

However, if one or more update packages apply to the device, an update package request is sent to the deployment service (act 618). The update package request is a request to obtain the one or more update packages that apply to the device from the deployment service.

The deployment service receives the update package request (act 620), and responds by sending the requested one or more update packages to the device (act 622). The one or more update packages can be identified in different manners (such as by using the master version number associated with an updates package). The device receives the requested one or more update packages (act 624) and installs the received one or more update packages on the device (act 626). The installation of each of the one or more update packages can be immediate or deferred, as discussed above. The current check for updates then ends (act 616). However, the deployment service continues to maintain the repository of update packages and the catalog of update package descriptions (act 602), and process 600 can be repeated for subsequent update check requests to be sent to the deployment service.

Alternatively, if one or more update packages apply to the device, those update packages can be returned to the device in act 610. In such situations, acts 616-620 need not be performed.

Figure 7:
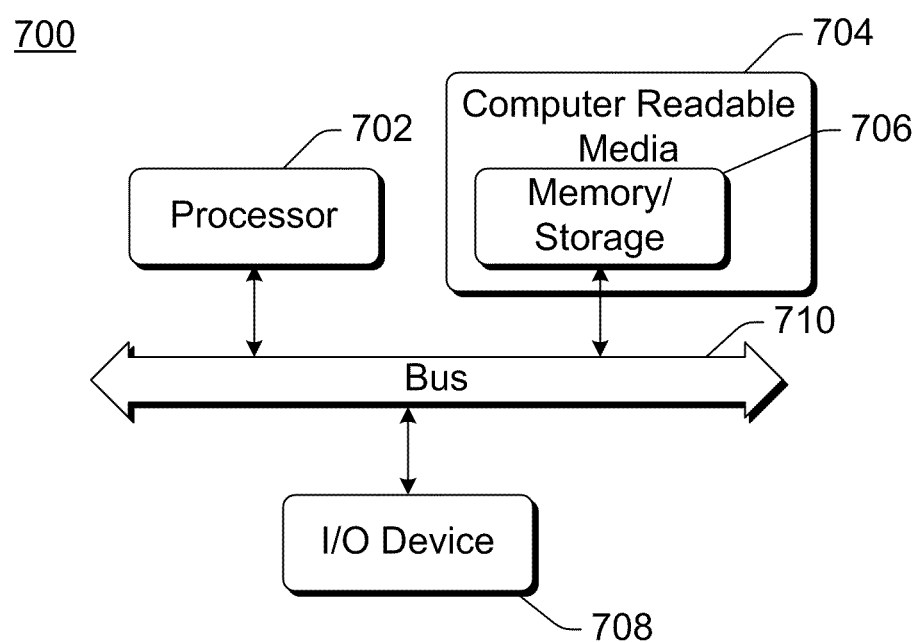
FIG. 7 illustrates an example computing device that can be configured to run applications including multiple experience modules in accordance with one or more embodiments.

FIG. 7 illustrates an example computing device 700 that can be configured to run applications including multiple experience modules in accordance with one or more embodiments. Computing device 700 can be, for example, a device 102 of FIG. 1, a device 200 of FIG. 2, or can implement at least part of a platform 114 of FIG. 1 or a platform 300 of FIG. 3.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the applications including multiple experience modules techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-based method in a device for implementing a deployment service, the device comprising at least a processor coupled with storage devices having executable instructions stored thereon, where the instructions, when executed by the processor, perform the method steps, comprising:

installing, on the device, an application that includes multiple experience modules that are each configured to implement a set of features when the application is running, each of the multiple experience modules including a first component that includes code specific to a particular type of the device, and a second component that includes code that is common across multiple types of devices, the code specific to the particular type of the device including presentation logic and resources that tailor presentation of an associated experience of the experience module to the particular type of the device based on physical features of the particular type of the device, and the code that is common across multiple types of devices including business logic that is common across the particular type of the device as well as other types of devices; and sending a request to a deployment service to check for updates to the application, the request including an identifier of the particular type of the device and a master version number of the application installed on the device, the master version number indicating a current experience version number for each of the one or more experience modules of the application installed on the device;

receiving, from the deployment service, one or more update packages for the one or more of the multiple experience modules, the one or more update packages corresponding to the particular type of the device;

installing, on the device, the one or more update packages; and updating the master version number of the application installed on the device to a most recent master version number of the application, the most recent master version number corresponding to a most recent update package of the one or more update packages installed on the device.

2. A method as recited in claim 1, wherein the multiple types of devices include a computer type of device, a mobile type of device, and a television based type of device, and wherein the particular type of the device is one of the multiple types of devices.

3. A method as recited in claim 1, further comprising isolating the multiple experience modules from one another to prevent each of the multiple) experience modules from directly accessing the other of the multiple experience modules.

4. A method as recited in claim 1, further comprising:
receiving, from a first of the multiple experience modules, a message including a requested action;
sending the message to a second of the multiple experience modules;
receiving, from the second of the multiple experience modules, a response message that includes a response to the message including the requested action; and
sending the response message to the first of the multiple experience modules.

5. A method as recited in claim 4, further comprising:
receiving, from each of the multiple experience modules, an indication of one or more actions that the experience module can perform;
receiving, from one or more of the multiple experience modules, a request to identify one of the multiple experience modules that can perform a particular action; and
returning, to the one or more of the multiple experience modules, an indication of one of the multiple experience modules that can perform the particular action.

6. A method as recited in claim 1, further comprising:
receiving, from a first of the multiple experience modules, a request;
sending the request to an additional device on which the application is installed;
receiving, from the additional device, a response to the request; and sending the response to the first of the multiple experience modules.

7. A method as recited in claim 1, further comprising:
determining, based on the indication of the one or more update packages, whether the one or more update packages are to be installed immediately; and
installing the one or more update packages prior to running the application a next time if it is determined that the one or more update packages are to be installed immediately.

8. One or more computer storage devices having stored thereon multiple instructions that, when executed by one or more processors, cause the one or more processors to:
maintain a catalog of different update packages for different experience modules of an application, the application including multiple experience modules that are each configured to implement a set of features when the application is running on a device, each of the multiple experience modules including a first component that includes presentation logic and resources specific to a particular type of the device that tailor presentation of an associated experience of the experience module to the particular type of the device based on physical features of the particular type of the device, and a second component that includes business logic that is common across multiple types of devices;
receive a request from the device for updates to the application, the request including an identifier of the particular type of the device and a current master version number of the application installed on the device;
determine, whether there is an update package that applies to the application on the device based at least in part on whether a master version number in the catalog indicates a newer version of one or more of the application's experience modules exists;
if a newer version of one or more of the application's experience modules exists, select one or more experience modules corresponding to the particular type of device to include n the update package; and
send, to the device, an indication of the update package, the indication of the update package including:
a most recent master version number of the application corresponding to the newer version of the application's one or more experience modules;
an experience module identifier indicating at least one of the multiple experience modules that is changed by the update package; and
an experience module version number of the changed one or more of the multiple experience modules.

9. One or more computer storage devices as recited in claim 8, wherein the multiple types of devices include a computer type of device, a mobile type of device, and a television based type of device, and wherein the particular type of the device is one of the multiple types of devices.

10. One or more computer storage devices as recited in claim 8, wherein the update package for one of the multiple experience modules identifies a change to a component in the one of the multiple experience modules.

11. One or more computer storage devices as recited in claim 8, wherein the multiple instructions further cause the one or more processors to maintain multiple different update packages for the application, and determine whether there is an update package that applies to the application on the device based at least in part on a user of the device.

12. One or more computer storage devices as recited in claim 8, wherein the multiple instructions further cause the one or more processors to maintain multiple different update packages for the application, and determine whether there is an update package that applies to the application on the device based at least in part on a geographic location of the device.

13. One or more computer storage devices as recited in claim 8, wherein to determine whether there is an update package that applies to the application on the device is to determine whether there is an update package that applies to the application on the device in response to an update check request received from the device.

14. A computer-based method for carrying out a deployment service, the service being implemented with one or more processors having stored thereon executable instructions, where the instructions, when executed by the one or more processors, perform the method steps, comprising:

maintaining a repository of multiple update packages for different experience modules of an application, the application including multiple experience modules that are each configured to implement a set of features when the application is running on a device, each of the multiple experience modules including a first component that includes presentation logic and resources specific to a particular type of the device that tailor presentation of an associated experience of the experience module to the particular type of the device based on physical features of the particular type of the device, and a second component that includes business logic that is common across multiple types of devices;

maintaining a catalog of information describing the multiple update packages, the catalog including, for each of the multiple update packages:

a master version number of the application, an experience module identifier indicating one of the multiple experience modules that is changed by the update package, an experience module version number of the changed one of the multiple experience modules, a device type mask indicating one or more types of devices to which the update package applies, and an indication of whether the update package is to be installed by the device immediately or can be deferred;

receiving a request from the device for updates to the application, the request including an identifier of the particular type of the device and a current master version number of the application installed on the device, the current master version number indicating the current experience module version numbers of each of the multiple experience modules of the application;

determining, based on the catalog, one or more of the multiple update packages that applies to the application on the device based on the one or more of the multiple update packages including a corresponding master version number that is more recent that the current master version number of the application installed on the device and including a device type mask corresponding to the particular type of the device; and sending, to the device, each of the multiple update packages that applies to the application on the device.

\* \* \* \* \*